US012680374B2

(12) United States Patent
Lee

(10) Patent No.: US 12,680,374 B2
(45) Date of Patent: Jul. 14, 2026

(54) SYSTEMS AND METHODS FOR MOVABLE BARRIER PANELS WITH DEEP STAMP-PROFILE DEPTH

(71) Applicant: OVERHEAD DOOR CORPORATION, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 216 days.

(21) Appl. No.: 18/628,124

(22) Filed: Apr. 5, 2024

(65) Prior Publication Data

US 2025/0314118 A1 Oct. 9, 2025

(51) Int. Cl.
*E06B 3/48* (2006.01)

(52) U.S. Cl.
CPC .................................... *E06B 3/485* (2013.01)

(58) Field of Classification Search
CPC ............. E06B 3/485; E06B 2003/7011; E06B 3/7015; E06B 2003/7044; E06B 2003/7048; E06B 2003/7049; E06B 2003/7075; E06B 2003/7082; E06B 2003/7086; E06B 3/72; E06B 3/721; E06B 3/723; E06B 7/32
See application file for complete search history.

(56) References Cited

U.S. PATENT DOCUMENTS 5,497,588 A * 3/1996 Martin ...................... E06B 3/72 52/476
5,626,176 A * 5/1997 Lewis, Jr. ............... E06B 3/485 160/229.1
5,743,057 A * 4/1998 Martin .................. E06B 3/7003 49/501
6,161,363 A * 12/2000 Herbst ...................... E06B 3/86 49/501
7,484,286 B2 * 2/2009 Fowler ...................... E06B 9/52 160/113
7,856,779 B2 * 12/2010 Moyes ..................... B27N 7/00 52/456
7,954,285 B2 * 6/2011 Taylor ................... E06B 3/5892 52/204.53
8,171,700 B2 * 5/2012 Barnes ...................... E06B 1/16 52/745.15
9,022,091 B2 * 5/2015 Shives .................... E06B 3/485 160/201
10,512,351 B1 * 12/2019 Valeriano ............ E05B 47/0001
10,597,930 B2 * 3/2020 Kornish ................ E06B 3/7001
11,078,717 B2 * 8/2021 Vitello ...................... E06B 3/26
11,905,756 B2 * 2/2024 Webb .................. B29C 65/7841
12,139,961 B2 * 11/2024 Lee ....................... E06B 3/5878
12,215,539 B1 * 2/2025 Earnest ................... E06B 3/485
12,291,920 B1 * 5/2025 Earnest ................. E06B 3/7009
12,460,473 B2 * 11/2025 Frost ......................... E06B 7/32
(Continued)

*Primary Examiner* — Beth A Aubrey
(74) *Attorney, Agent, or Firm* — Haynes and Boone, LLP

(57) ABSTRACT

A panel for a sectional door may include a one-piece, sheet-metal facer panel comprising a front surface, a back surface, and a drawn ledge. The drawn ledge may be disposed at a position spaced a distance apart from both the front surface and the back surface, with the drawn ledge defining a hole through the one-piece, sheet-metal facer panel. A backer panel may include an interior surface configured to cover the hole in the one-piece, sheet-metal facer panel. The interior surface may be positioned to support the drawn ledge.

20 Claims, 10 Drawing Sheets

(56) References Cited

U.S. PATENT DOCUMENTS

| | | | | | |
|---|---|---|---|---|---|
| 2003/0221803 | A1* | 12/2003 | Forsland | E06B 3/5892 | 160/229.1 |
| 2004/0250967 | A1* | 12/2004 | Dorest | E06B 9/52 | 160/180 |
| 2005/0115198 | A1* | 6/2005 | Lynch | E06B 3/7003 | 52/784.1 |
| 2009/0100763 | A1* | 4/2009 | Leist | E05D 15/16 | 49/506 |
| 2009/0223131 | A1* | 9/2009 | Wiese | E06B 3/7001 | 49/506 |
| 2014/0196377 | A1* | 7/2014 | Muto | E06B 3/485 | 49/465 |
| 2018/0238102 | A1* | 8/2018 | Kornish | E06B 3/485 | |
| 2023/0366263 | A1* | 11/2023 | Brunette | E06B 9/174 | |

* cited by examiner

SYSTEMS AND METHODS FOR MOVABLE BARRIER PANELS WITH DEEP STAMP-PROFILE DEPTH

TECHNICAL FIELD

The present disclosure relates generally to sectional door systems such as doors, gates, and other moveable barriers, and more particularly to systems and methods for increasing the depth of a stamp profile with reduced effect on a panel's sheet metal.

BACKGROUND

Sectional door panels may be created using sheet metal, such as steel, formed into panels with embossed stamps. Embossed stamps may be sequentially spaced along a panel to form an appearance of a wooden rail-and-stile door panel. The limitations of sheet metals may typically require a recess (e.g., a stamp) in a sheet-metal panel to be made shallower than in wooden door panels. Modifications to the sheet metal to potentially increase its ability to stretch into deeper stamp profiles may compromise other desired properties of the sheet metal. Moreover, modifications to increase flexibility of the sheet metal may not justify higher material costs and reduced material strength. Thus, there remains a need for effective ways to increase the depth of a stamp profile with reduced effect on a panel's sheet metal.

SUMMARY

Embodiments of the present disclosure include systems, devices, and methods of increasing the depth of a stamp profile with reduced effect on a panel's sheet metal.

In some examples, a panel for a sectional door may comprise a one-piece, sheet-metal facer panel comprising a front surface, a back surface, and a drawn ledge, the drawn ledge disposed at a position spaced a distance apart from both the front surface and the back surface, and the drawn ledge defining a hole through the one-piece, sheet-metal facer panel. The panel may further comprise a backer panel comprising an interior surface configured to cover the hole in the one-piece, sheet-metal facer panel, the interior surface being positioned to support the drawn ledge.

In some examples, a panel for a sectional door may comprise a one-piece, sheet-metal facer panel comprising a front surface, a back surface, and a drawn ledge, a deep drawn stamped region extending from the front surface, through the back surface, and to the drawn ledge, the drawn ledge disposed at a position spaced a distance apart from both the front surface and the back surface, and the drawn ledge defining a hole through the one-piece, sheet-metal facer panel. The panel may further comprise a backer panel comprising an interior surface configured to cover the hole in the one-piece, sheet-metal facer panel, the interior surface being positioned to support the drawn ledge.

In some examples, a method of manufacturing a panel for a sectional door may comprise providing a one-piece, sheet-metal facer panel comprising a front surface and a back surface. The method may further comprise creating a hole through the one-piece, sheet-metal facer panel extending from the front surface to the back surface, the hole comprising a cross-sectional area parallel to the front surface and the back surface. The method may further comprise stamping an area on the front surface larger than the cross-sectional area of the hole such that a drawn ledge forms, the drawn ledge disposed at a position offset from the front surface and the back surface. The method may further comprise positioning an interior surface of a backer panel to support the drawn ledge.

Additional aspects, features, and advantages of the present disclosure will become apparent from the following detailed description.

BRIEF DESCRIPTION OF THE DRAWINGS

The accompanying drawing figures incorporated in and forming a part of this specification illustrate several aspects of the disclosure, and together with the description, serve to explain the principles of the disclosure.

DETAILED DESCRIPTION

Figure 1:
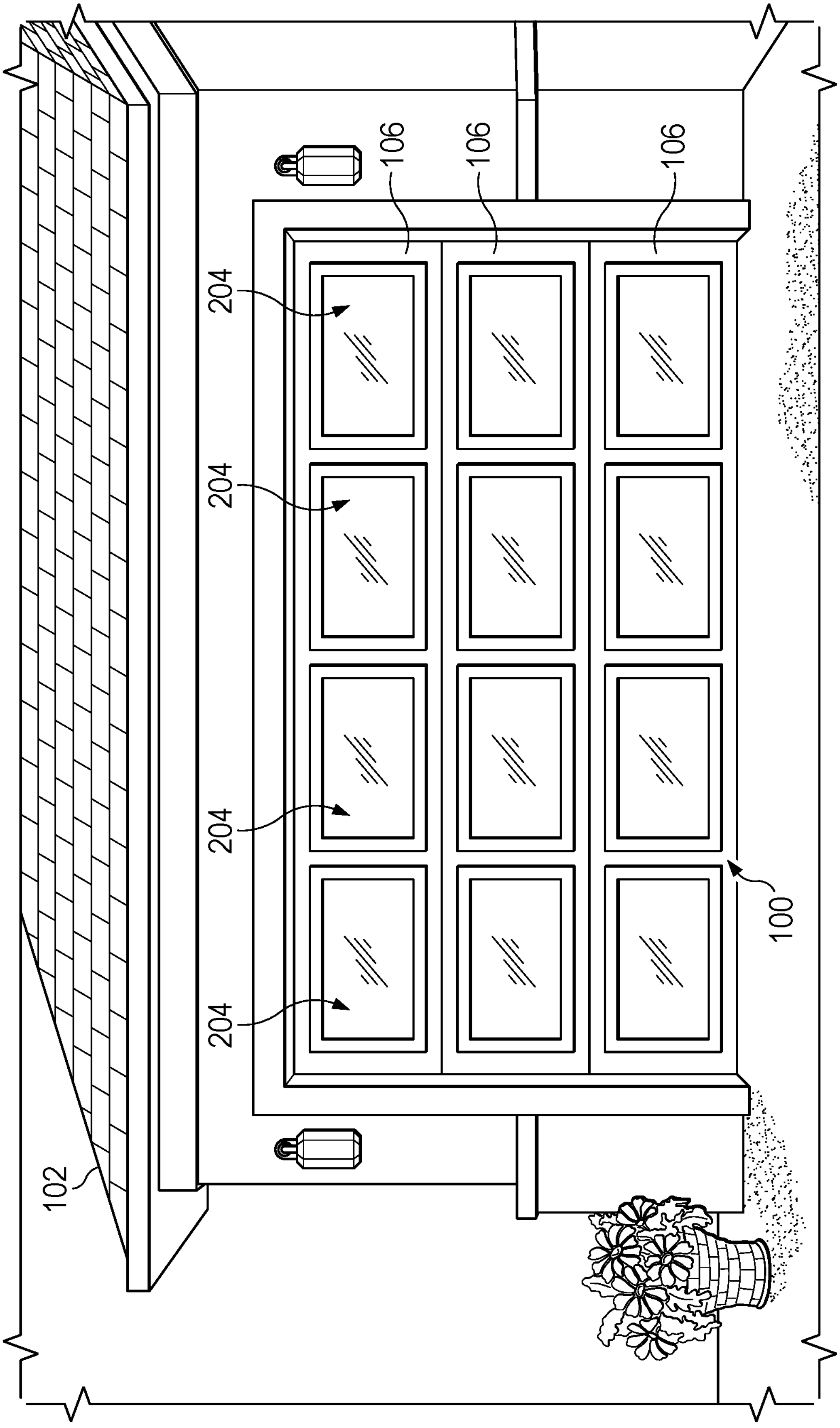
FIG. 1 is a front view of an example movable barrier on a building, according to some aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Disclosed herein are systems, methods, and devices for increasing the depth of a stamp profile with reduced effect on a panel's sheet metal, by decreasing the amount of sheet metal used at the stamp-base. Thus, the present disclosure allows for a deeper stamped feature than conventional stamped features, thereby producing a more aesthetically pleasing deep drawn stamped region without substantially modifying the properties of a panel's sheet metal.

Producing an aesthetically acceptable imitation of a wooden rail-and-stile door from sheet metal, such as steel, typically involves creating deeper embossed stamps in a panel. While many door designers and architects may prefer to create stamp recesses as deep as ¾" to 1", most sheet metal coils used in panel production may typically accommodate approximately ¼" of depth because of the limitations of the mechanical properties of the sheet metal.

This disclosed system and/or method may potentially mitigate the limitations of sheet metal by reducing material at points on a panel where it might normally tear and fail. Thus, the sheet metal may press and stretch into areas deeper into the panel and may align with a back of a panel to provide a mating surface for a backer panel which may become a bottom of a stamp.

Stamped features may be formed into the facer steel of a panel. A hole may be created in the facer where the stamp will occur to potentially allow a stamped profile to be formed. At the base of the stamped region, a flat perimeter may form which may be wide enough for adhering to a backer panel. The backer panel may be adhered to each stamped region and secured to the facer panel.

FIG. 1 is a front view of an example movable barrier on a building, according to some aspects of the present disclosure. The movable barrier 100 may be a barrier to entry into a garage of a building 102. In this example, the movable barrier 100 is an upward acting sectional-type garage door. In some examples, as shown in FIG. 1, the movable barrier 100 may include three stacked panels 106. The panels 106 may include various panels formed of opaque, transparent, and/or semi-transparent materials. The panel 106 may comprise sheet metal which may comprise any type and/or combination of metal and/or alloy (for example, steel).

Figure 2:
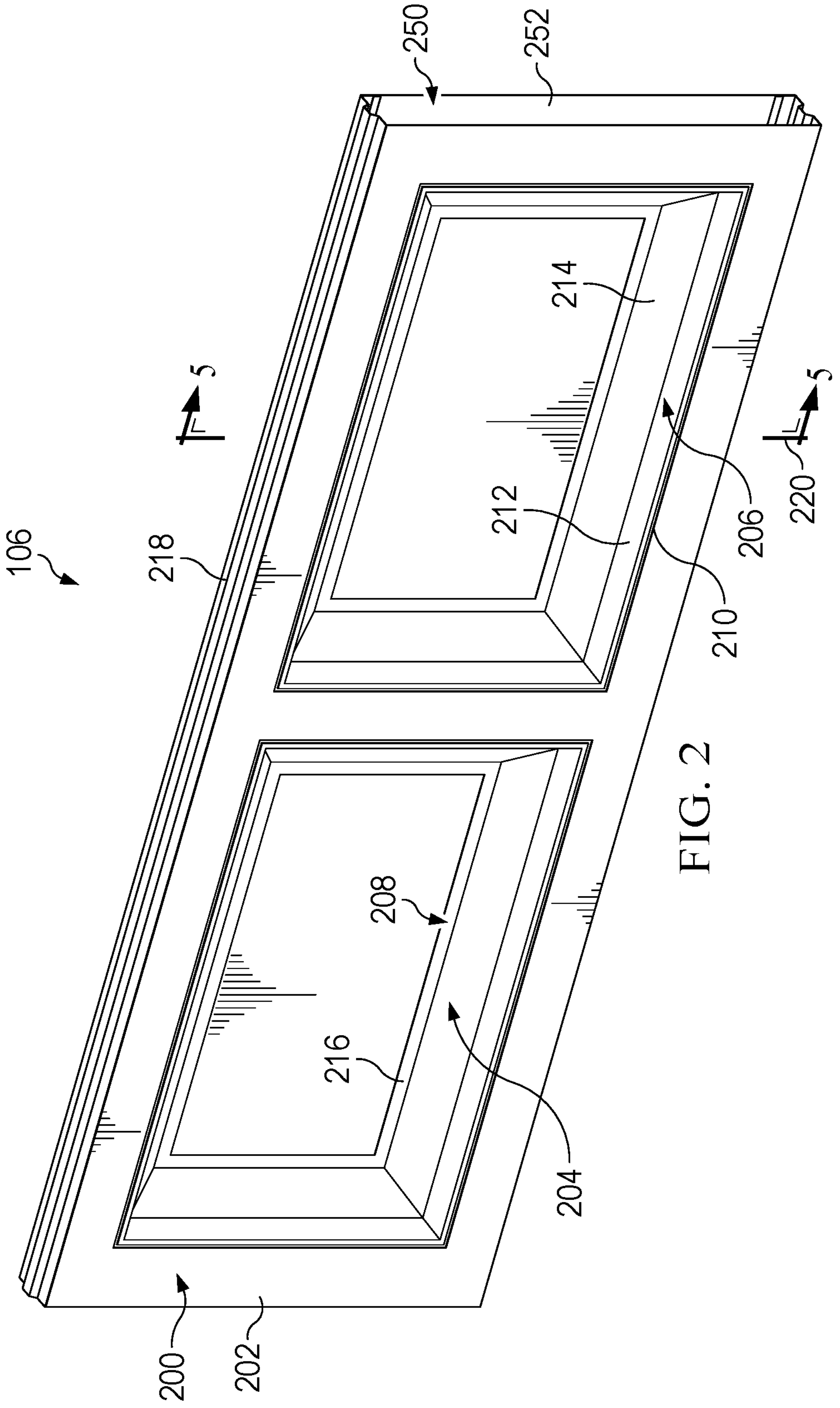
FIG. 2 is a perspective view of a panel, according to some aspects of the present disclosure.
Figure 3:
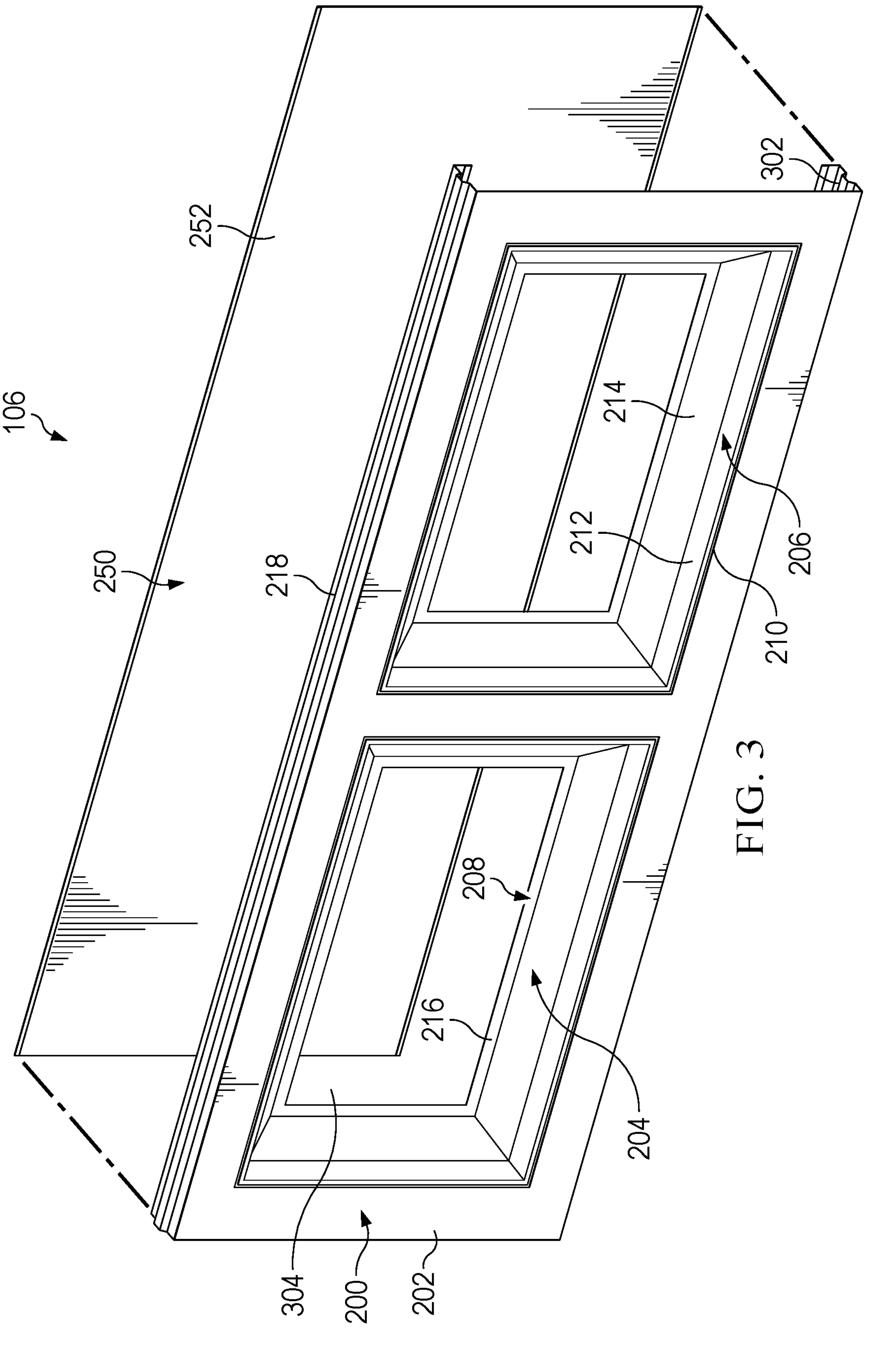
FIG. 3 is an exploded view of a panel, according to some aspects of the present disclosure.

FIG. 2 is a perspective view of at least a portion of a panel 106, according to some aspects of the present disclosure. FIG. 3 is an exploded view of the panel 106. The panel 106 may comprise two layers, such as a one-piece facer panel 200 and a backer panel 250. In some embodiments, the facer panel 200 may additionally be referred to interchangeably as a "pan" and/or a "section pan" and/or a "front facer pan." The facer panel may comprise a front surface 202. The facer panel 200 may further comprise at least one deep drawn stamped region 204. The at least one deep drawn stamped region 204 is the deformed portion of the facer panel 200 pressed into the front surface 202. In some embodiments, a facer panel 200 will comprise two deep drawn stamped regions 204. However, other amounts of deep drawn stamped regions 204 are contemplated. For example, FIG. 1 shows the panel 106 with four deep drawn stamped regions. The deep drawn stamped region 204 may comprise a bezel 206 and a ledge 208.

The bezel 206 may be positioned to wholly comprise the sides of the deep drawn stamped region 204. The bezel 206 may comprise an upper bezel 210, an intermediate bezel 212, and a lower bezel 214. The bezel 206 may extend from the front surface 202 to the ledge 208. The bezel 206 may be exactly or substantially perpendicular to the front surface 202 and the ledge 208 or the bezel 206 may be inclined. The upper bezel 210 may be positioned adjacent to the front surface 202. The intermediate bezel 212 may be positioned adjacent to the upper bezel 210 and the lower bezel 214. The lower bezel 214 may be positioned adjacent to the ledge 208. The upper bezel 210, the intermediate bezel 212, and the lower bezel 214 may have the same angle of incline or different angles of incline. Thus, in some embodiments, the separation between the upper bezel 210, the intermediate bezel 212, and the lower bezel 214 may be clear based on change(s) in angle of incline. In some embodiments, the upper bezel 210, intermediate bezel 212, and/or the lower bezel 214 may be non-planar, such as having an arc or curve.

The ledge 208 may comprise an outer ledge surface 216 facing outwardly. The ledge 208 may be offset a distance apart from the front surface 202 (best seen in the cross-section of FIG. 6). In some implementations, the outer ledge surface 216 may form a surface parallel with the front surface 202. The ledge 208 may extend a distance from the end of the bezel 206. In some embodiments the ledge 208 may extend to the interior of the deep drawn stamped region 204. In some embodiments, the ledge 208 may extend away from the outer perimeter of deep drawn stamped region 204. In some embodiments, the ledge 208 may be a drawn ledge.

The facer panel 200 may further comprise an upper rail 218. The upper rail 218 may be located at the top of the facer panel 200. In some embodiments, the upper rail 218 may be substantially perpendicular to the front surface 202. In some embodiments, the upper rail 218 may comprise one or more surfaces. In some embodiments, the upper rail 218 may be roll formed.

The backer panel 250 may comprise an interior surface 252. The facer panel 200 may couple with the interior surface 252 such that the interior surface 252 is adjacent to the ledge 208. Thus, the front surface 202, the ledge 208, the outer ledge surface 216, and the interior surface 252 may be parallel. Depending on the embodiment, the facer panel 200 may be adhered to the backer panel 250. This may be done using an adhesive, polyurethane from the foaming process, or any other attachment method. The facer panel 200 and the interior surface 252 may be attached by any other way, such as fasteners, mechanical attachment, adhesive, glue, etc. It should be understood that any adhesive used to couple any parts of the panel 106 may be any type of adhesive such as a structural acrylic adhesive, epoxy, polyurethane, and/or cyanoacrylate.

FIG. 3 shows the facer panel 200 and the backer panel 250 disassembled and separated from each other. The facer panel 200 may further comprise at least one stamp-base hole 304. The stamp-base hole 304 may extend through the facer panel 200. The stamp-base hole 304 may be different sizes and/or shapes depending on the embodiment. In some embodiments, the stamp-base hole may be positioned at the base of the deep drawn stamped region 204. In some embodiments, the stamp-base hole 304 may be partially or fully defined by the ledge 208 and/or the outer ledge surface 216. In some embodiments, the facer panel 200 may comprise two or more stamp-base holes 304. The facer panel 200 may further comprise a lower rail ledge 302. The lower rail ledge 302 may extend from the facer panel 200. The lower rail ledge 302 may be substantially perpendicular to the front surface 202. In some embodiments, the lower rail ledge 302 may comprise one or more surfaces. In some embodiments, the lower rail ledge 302 may be roll formed.

Figure 4:
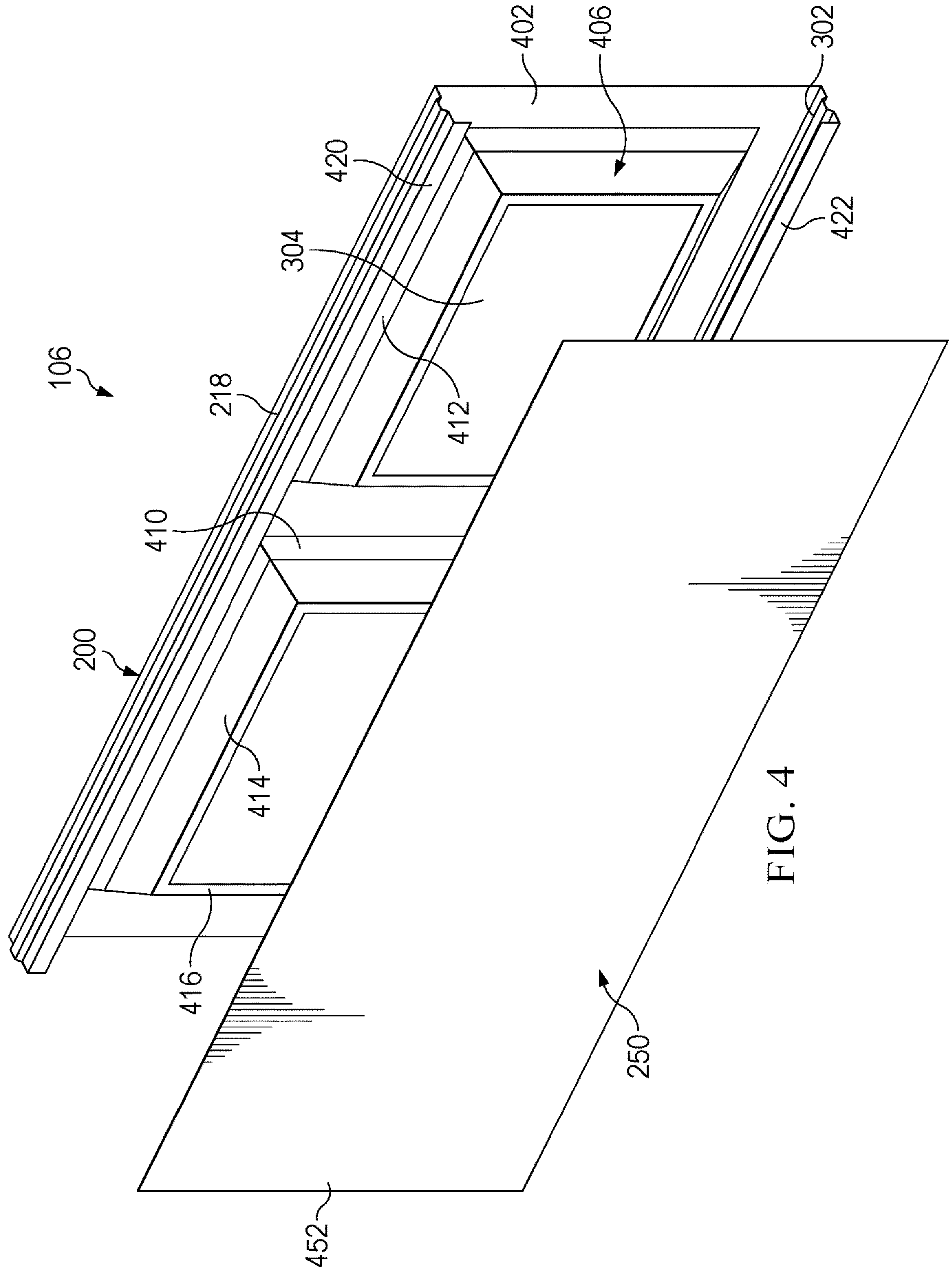
FIG. 4 is a back, exploded view of a panel, according to some aspects of the present disclosure.

FIG. 4 is a back, exploded view of a panel 106, according to some aspects of the present disclosure. In FIG. 4, the facer panel 200 and the backer panel 250 are disassembled and separated from each other. The facer panel may further comprise a back surface 402. The back surface 402 may be positioned opposite the front surface 202. The facer panel 200 may further comprise an interior bezel 406 and an inner ledge surface 416.

The interior bezel 406 may be positioned opposite the bezel 206. The interior bezel 406 may be the backside surfaces of the deep drawn stamped region 204. The interior bezel may further comprise an upper, interior bezel 410 forming the backside surface of the upper bezel 210; an intermediate, interior bezel 412 forming the backside surface of the intermediate bezel 212; and a lower, interior bezel 414 forming the backside surface of the lower bezel 214. The interior bezel 406 may extend from the back surface 402 to the ledge 208. The interior bezel 406 may be exactly or substantially perpendicular to the back surface 402 and the ledge 208 or it may be inclined. The upper, interior bezel 410 may be positioned adjacent to the back surface 402. The intermediate, interior bezel 412 may be positioned adjacent to the upper, interior bezel 410 and the lower, interior bezel 414. The lower, interior bezel 414 may be positioned adjacent to the inner ledge surface 416. The upper, interior bezel 410; the intermediate, interior bezel 412; and the lower, interior bezel 414 may have the same angle of incline or different angles of incline. Thus, in some embodiments, the separation between the upper, interior bezel 410; the intermediate, interior bezel 412; and the lower, interior bezel 414 may be clear based on a change in angle of incline. In some embodiments, the upper, interior bezel 410 may be non-planar.

The ledge 208 may comprise an inner ledge surface 416 facing inwardly and forming the backside surface of the outer ledge surface 216. The inner ledge surface 416 may be offset a distance apart from the front surface 202 and/or the back surface 402. The inner ledge surface 416 may be parallel with the back surface 402 and the front surface 202. In some embodiments, the facer panel 200 may comprise a fillet and/or chamfer at the boundary between the front surface 202 and the upper, interior bezel 410; between the upper, interior bezel 410 and the intermediate, interior bezel 412; between the intermediate, interior bezel 412 and the lower, interior bezel 414; between the lower, interior bezel 414 and the ledge 208; and between any other surfaces on the panel 106.

The facer panel 200 may further comprise an upper lip 420 and a lower lip 422. The upper lip 420 and the lower lip 422 may be offset a distance apart from and/or be parallel to the back surface 402. The upper lip 420 may be positioned adjacent and substantially perpendicular to the upper rail 218. The lower lip 422 may be positioned adjacent and substantially perpendicular to the lower rail ledge 302. The upper lip 420 may be coplanar with the lower lip 422. The upper lip 420 and/or lower lip 422 may be coplanar with the ledge 208 and/or the inner ledge surface 416. When the facer panel 200 couples with the interior surface 252, the inner ledge surface 416, the upper lip 420, and the lower lip 422 may couple with the interior surface 252. Thus, in some embodiments, at least three planar surfaces 416, 420, 422 couple with the interior surface 252. The interior surface 252 may cover the stamp-base hole 304.

The facer panel 200 may further comprise a lower rail ledge 302. The lower rail ledge 302 may comprise one or more surfaces. In some embodiments, the lower rail ledge 302 may be roll formed. The backer panel 250 may further comprise an exterior surface 452. The exterior surface 452 may be opposite the interior surface 252.

Figure 5:
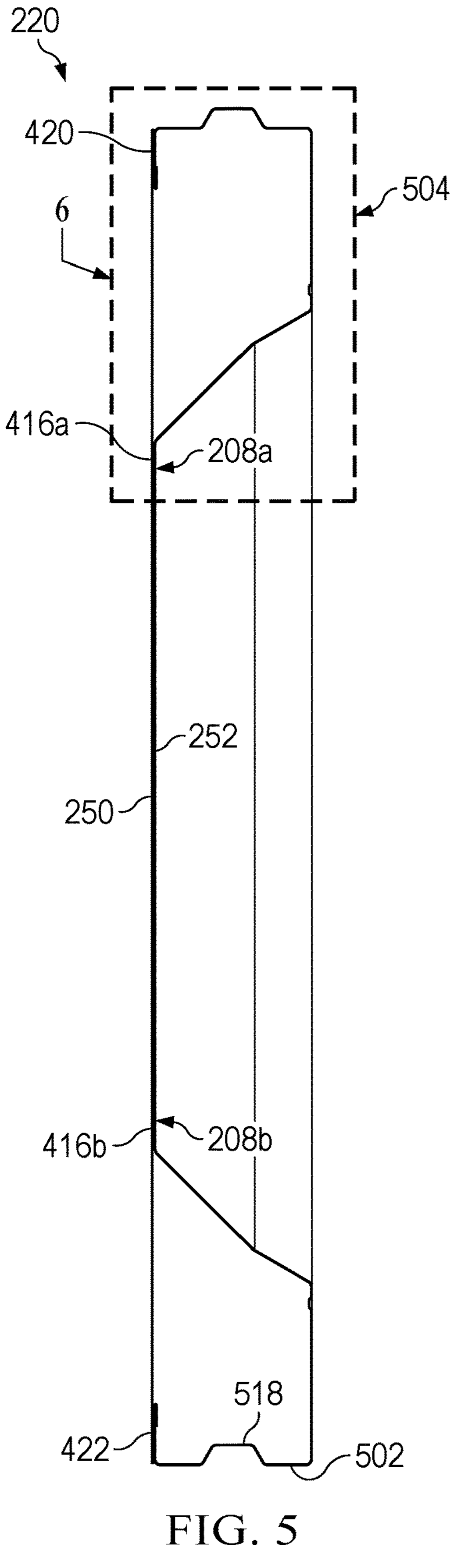
FIG. 5 is a cross-sectional view of a panel taken along lines 5-5 in FIG. 2, according to some aspects of the present disclosure.

FIG. 5 is a cross-sectional view of a panel taken along lines 5-5 in FIG. 2, according to some aspects of the present disclosure. FIG. 5 may comprise a cross-sectional view 220 of FIG. 2. Here, the facer panel 200 is coupled to the backer panel 250. The ledge 208*a*, 208*b* and/or the inner ledge surface 416*a*, 416*b*; the upper lip 420; and the lower lip 422 may couple with the interior surface 252 of the backer panel 250. Thus, in some embodiments, in a cross-sectional view 220, four planar surfaces 416*a*, 416*b*, 420, 422, in the same plane, are coupled to the interior surface 252 of the backer panel 250.

The facer panel 200 may further comprise a lower rail 502 comprising a groove 518. The lower rail 502 may be positioned adjacent to the bottom of the facer panel 200. In some embodiments, the lower rail 502 may be substantially perpendicular to the front surface 202 and the back surface 402. In some embodiments, the lower rail 502 may comprise one or more surfaces. In some embodiments, the lower rail 502 may be roll formed. The groove 518 may be positioned to comprise a portion of the profile of the lower rail 502. In some embodiments, the groove 518 may comprise at least one fillet and/or chamfer.

Figure 6:
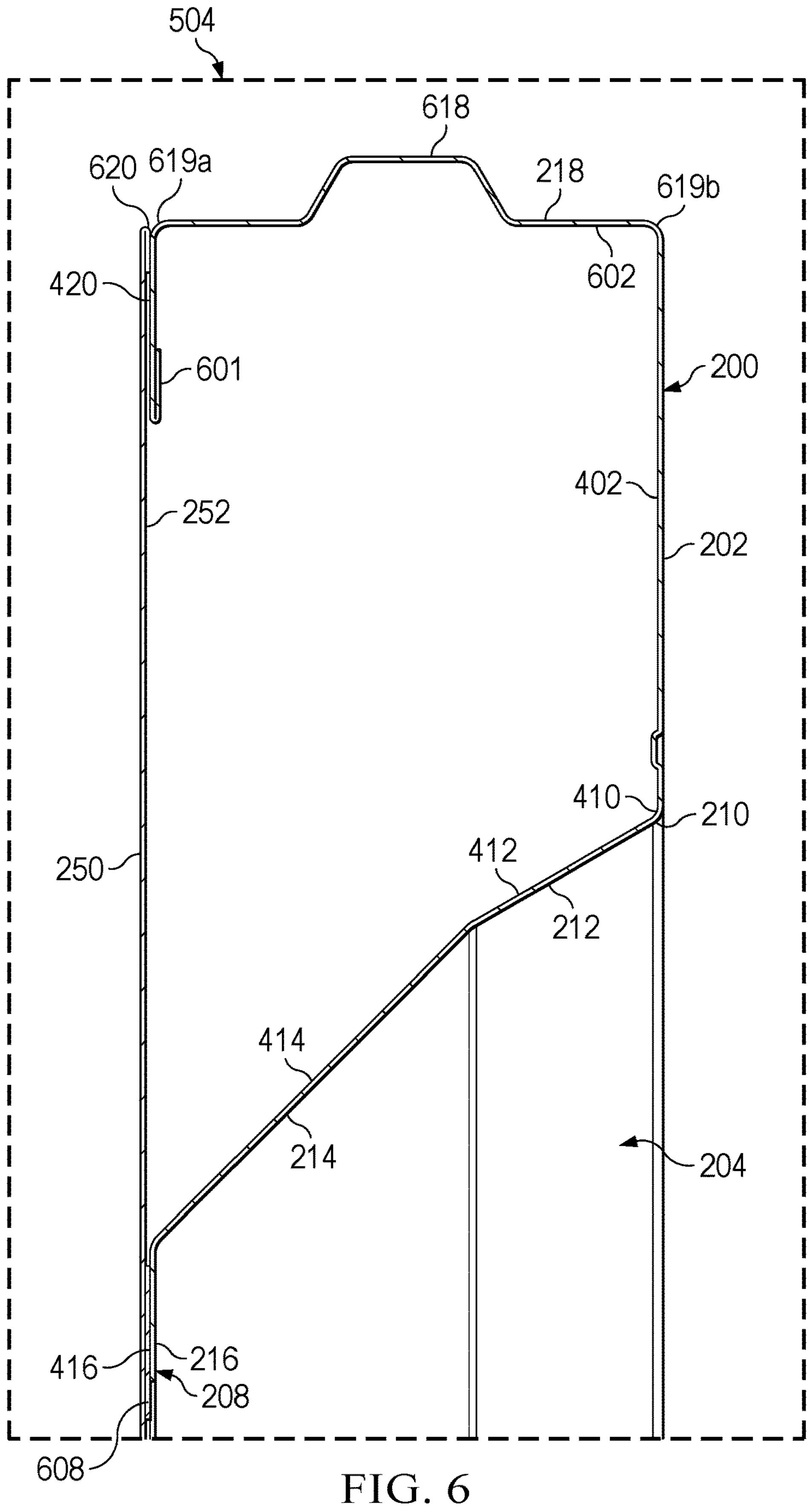
FIG. 6 is a sectional view of a panel, according to some aspects of the present disclosure.

FIG. 6 is a more detailed sectional view 504 of a portion of the backer 220 in FIG. 5. FIG. 6 may further illustrate the coupling of the facer panel 200 with the backer panel 250 in greater detail. The upper lip 420 may couple with the interior surface 252. In some embodiments, an edge of the upper lip 420 and/or the backer panel 250 may comprise at least one hem 601, 620 in order to avoid sharp edges and/or for any other reason. The at least one hem 601, 620 may be any shape and/or size such as a flat hem, an open hem, a rolled hem, a teardrop hem, and/or a rope hem, among others. In some embodiments, a lip adhesive may adhere the interior surface 252 to the upper lip 420. It should be appreciated that the lip adhesive may not be required in all embodiments to couple the upper lip 420 with the interior surface 252. The inner ledge surface 416 may couple with the interior surface 252. In some embodiments, a ledge adhesive 608 may adhere the interior surface 252 to the inner ledge surface 416. It should be appreciated that the ledge adhesive 608 may not be required in all embodiments to couple the interior surface 252 to the inner ledge surface 416.

The upper rail 218 may further comprise a tongue 618 and rounded edges 619*a*, 619*b*. The tongue 618 may be positioned to comprise a portion of the profile of the upper rail 218. In some embodiments, the tongue 618 of one panel 106 may couple with the groove 518 of another panel 106 possibly when part of a door system. In some embodiments, the tongue 618 may comprise at least one fillet and/or chamfer. In some embodiments, the at least one fillet and/or chamfer of the tongue 618 may allow the tongue 618 to couple more effectively with the groove 518. Thus, the tongue 618 and the groove 518 may have a similar or same profile depending on the embodiment. In some embodiments, the rounded edges 619*a*, 619*b* may allow for multiple panels 106 to move more effectively relative to each other. For example, the rounded edges 619*a*, 619*b* may allow a panel 106 to rotate relative to a horizontal axis without scraping an adjacent panel 106 and/or any nearby object(s). The facer panel 200 may further comprise an upper rail ledge 602 which may be opposite the upper rail 218.

If windows and/or lites are desired in a panel 106, at least one hole cutout may be added to the backer panel 250 which aligns with the stamp-base hole 304 in the deep drawn stamped region 204 in the facer panel 200.

Figure 7:
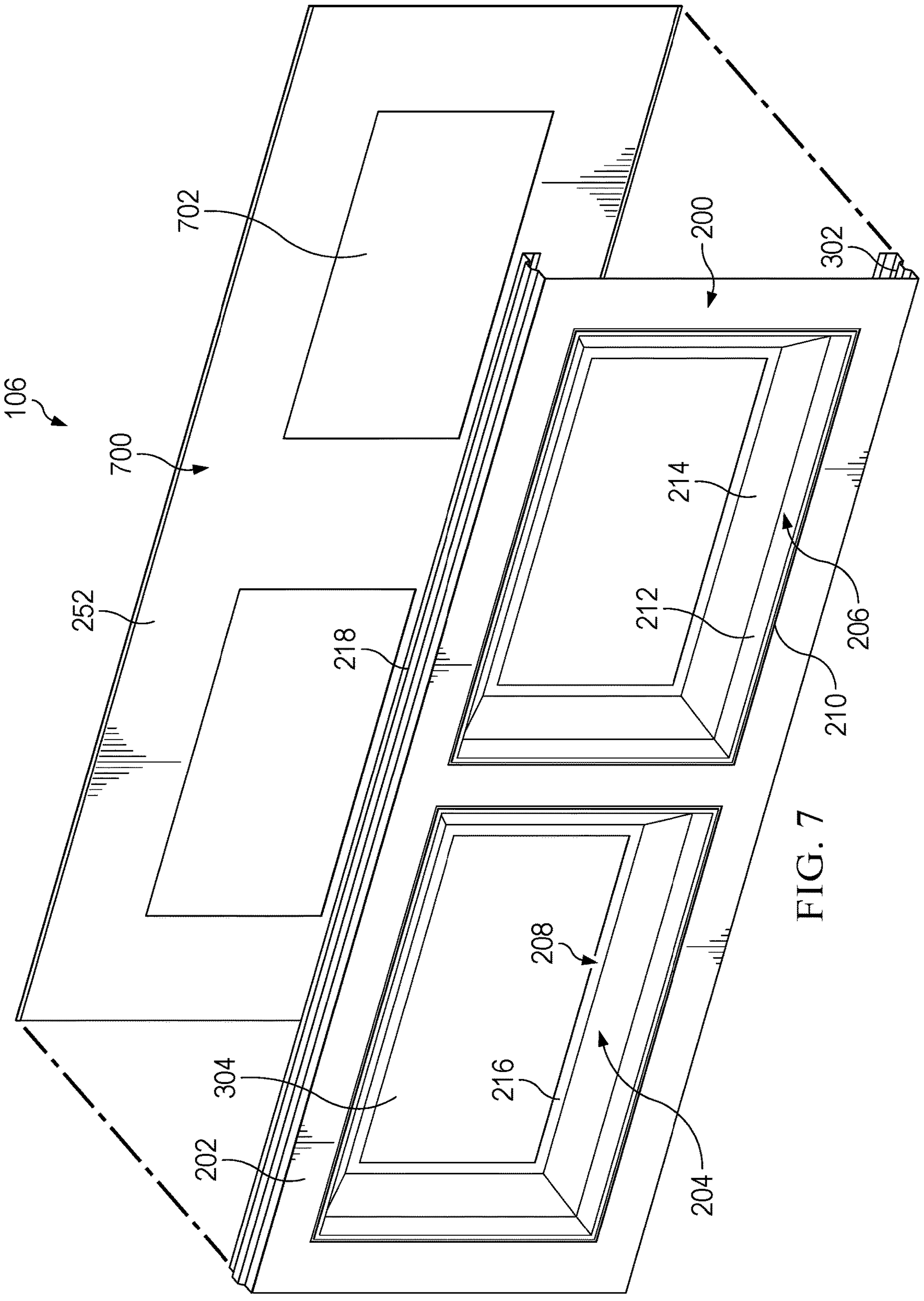
FIG. 7 is an exploded view of a panel, according to some aspects of the present disclosure.

FIG. 7 is an exploded view of a panel 106, according to some aspects of the present disclosure. In some embodiments, the backer panel 700 may comprise at least one backer hole 702. In some embodiments, the backer hole 702 may be aligned with the stamp-base hole 304. In some embodiments, the backer hole 702 may be aligned with the perimeter of the ledge 208. In some embodiments, the facer panel 200 may comprise two backer holes 702.

In some embodiments, the at least one backer hole 702 in the backer panel 700 may accommodate the installation of various lite frame systems. In some embodiments, the two panels with corresponding cutouts may be secured together using adhesive and/or mechanical interlocking mechanism (s) of a lite frame system, such as a 2-part lite frame system (i.e., including at least one outside frame and at least one inside frame). In some embodiments, fasteners may be used to couple parts of the lite frame system and/or to couple the lite frame system to the panel 106.

Figure 8:
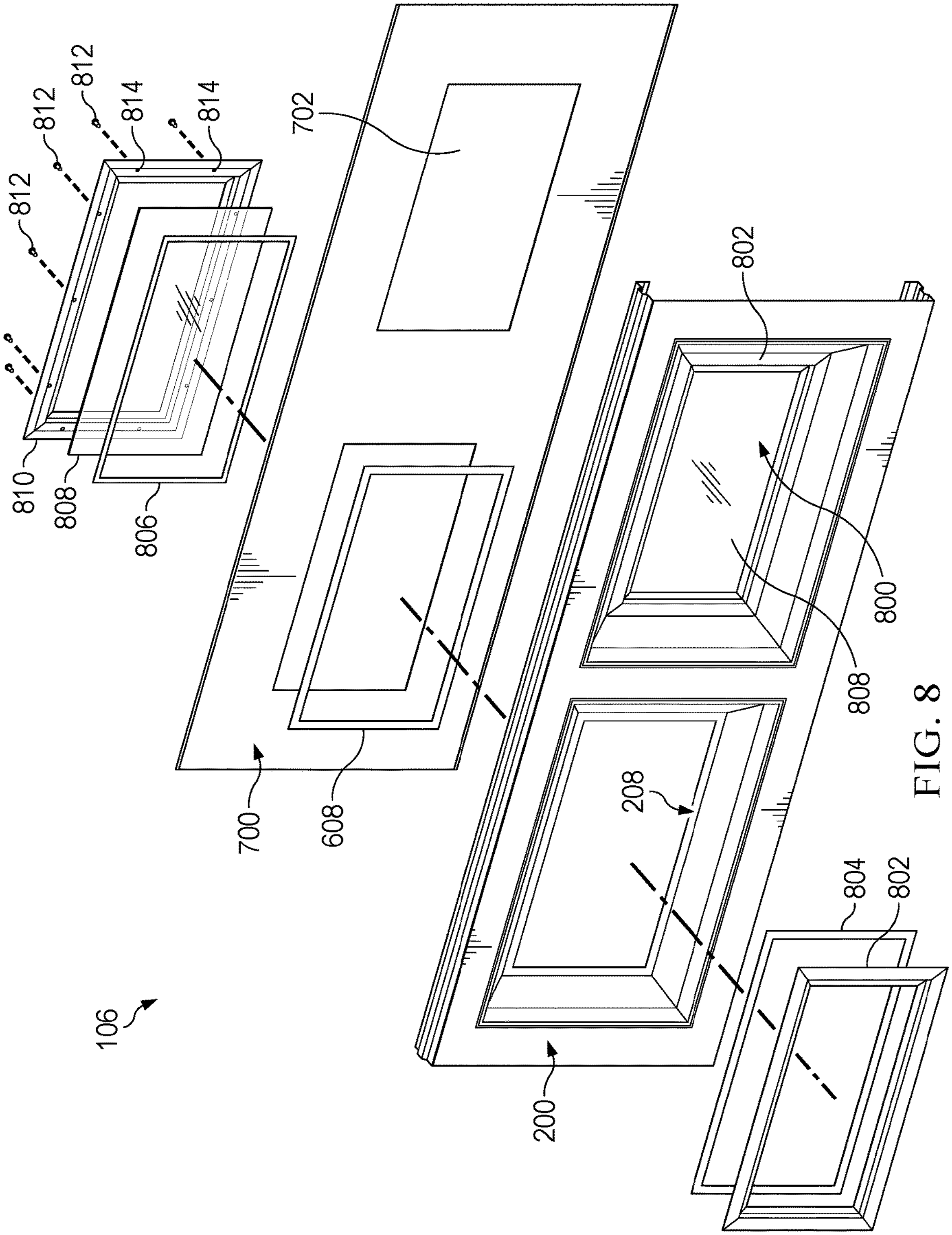
FIG. 8 is an exploded and perspective view of a panel and a lite frame assembly, according to some aspects of the present disclosure.

FIG. 8 is an exploded and perspective view of a panel 106 and a lite frame assembly 800, according to some aspects of the present disclosure. In some embodiments, the panel 106 may further comprise a lite frame system 800. In FIG. 8, the parts of the lite frame system are illustrated both as disassembled and separated from each other and as assembled. The lite frame system may comprise an outer lite frame 802, a frame-to-section seal 804, a glazing seal 806, a translucent panel 808, an inner lite frame 810, fasteners 812, and fastener holes 814. The frame-to-section seal 804 may couple the outer lite frame 802 to the ledge 208. It should be appreciated that the frame-to-section seal 804 may not be required in all embodiments to couple the outer lite frame to the ledge 208. In some embodiments, the outer lite frame 802 and/or the frame-to-section seal 804 may be configured to cover the entire outer ledge surface 216.

The glazing seal 806 may couple the translucent panel 808 and/or the inner lite frame 810 to the exterior surface 452. It should be appreciated that the glazing seal 806 may not be required in all embodiments to couple the translucent panel 808 and/or the inner lite frame 810 to the exterior surface 452. In some embodiments, the inner lite frame 810, the translucent panel 808, and/or the glazing seal 806 may be configured to be adjacent to the entire perimeter of the backer hole 702. In some embodiments, the outer lite frame 802 may be coupled directly to the inner lite frame 810 instead of or in addition to being coupled to the ledge 208 and the exterior surface 452 respectively.

In some embodiments, fasteners 812 may be used to couple the outer lite frame 802 to the inner lite frame 810. In some embodiments, fasteners 812 may be used to couple the outer lite frame 802 to the facer panel 200. In some embodiments, fasteners 812 may be used to couple the inner lite frame 810 to the backer panel 700. In some embodiments, fasteners 812 may be used to couple the facer panel 200 to the backer panel 700. In some embodiments, fastener holes 814 may extend wholly or partially through the inner lite frame 810, the translucent panel 808, the backer panel 700, the facer panel 200, and/or the outer lite frame 802 to accommodate the fasteners 812. In some embodiments, the fastener holes 814 may be any size, radius, depth, and/or shape and may be threaded, partially threaded, not threaded, and/or tapped.

In some embodiments, the fasteners 812 may be any type of fastener, for example, a screw, a bolt, an anchor, a rivet, a nail, etc. The fastener 812 may also be a plastic or metal post which is adhesively connected to the two lite frames 802, 810. In some embodiments, the fastener holes 814 extending through the inner lite frame may also extend through the translucent panel 808, the backer panel 700, the facer panel 200, and/or the outer lite frame 802. In some embodiments, the fastener holes 814 may not extend through the translucent panel 808, the backer panel 700, the facer panel 200, and/or the outer lite frame 802. However, the translucent panel 808, the backer panel 700, the facer panel 200, and/or the outer lite frame 802 may be marked or may be indented to indicate where the fasteners 812 could be inserted.

In some embodiments, the translucent panel 808 may comprise glass and/or any other transparent and/or any other semi-transparent material(s). The example frame members 802, 810 described herein may not be limited to use with a translucent panel 808 and may be used with any other material that may be framed. This may include materials that are not transparent.

In some embodiments, the frame-to-section seal 804 and the glazing seal 806 may be considered sealants. In some embodiments, the frame-to-section seal 804 and the glazing seal 806 may be any adhesive such as such as a structural acrylic adhesive, epoxy, polyurethane, and/or cyanoacrylate. In some embodiments, the frame-to-section seal 804 and the glazing seal 806 may be gaskets, such as a rubber gasket. In some embodiments, the frame-to-section seal 804 and the glazing seal 806 may be both any adhesive and a seal and/or gasket. In some implementations, fasteners may be used instead of and/or in addition to the frame-to-section seal 804 and the glazing seal 806.

Figure 9:
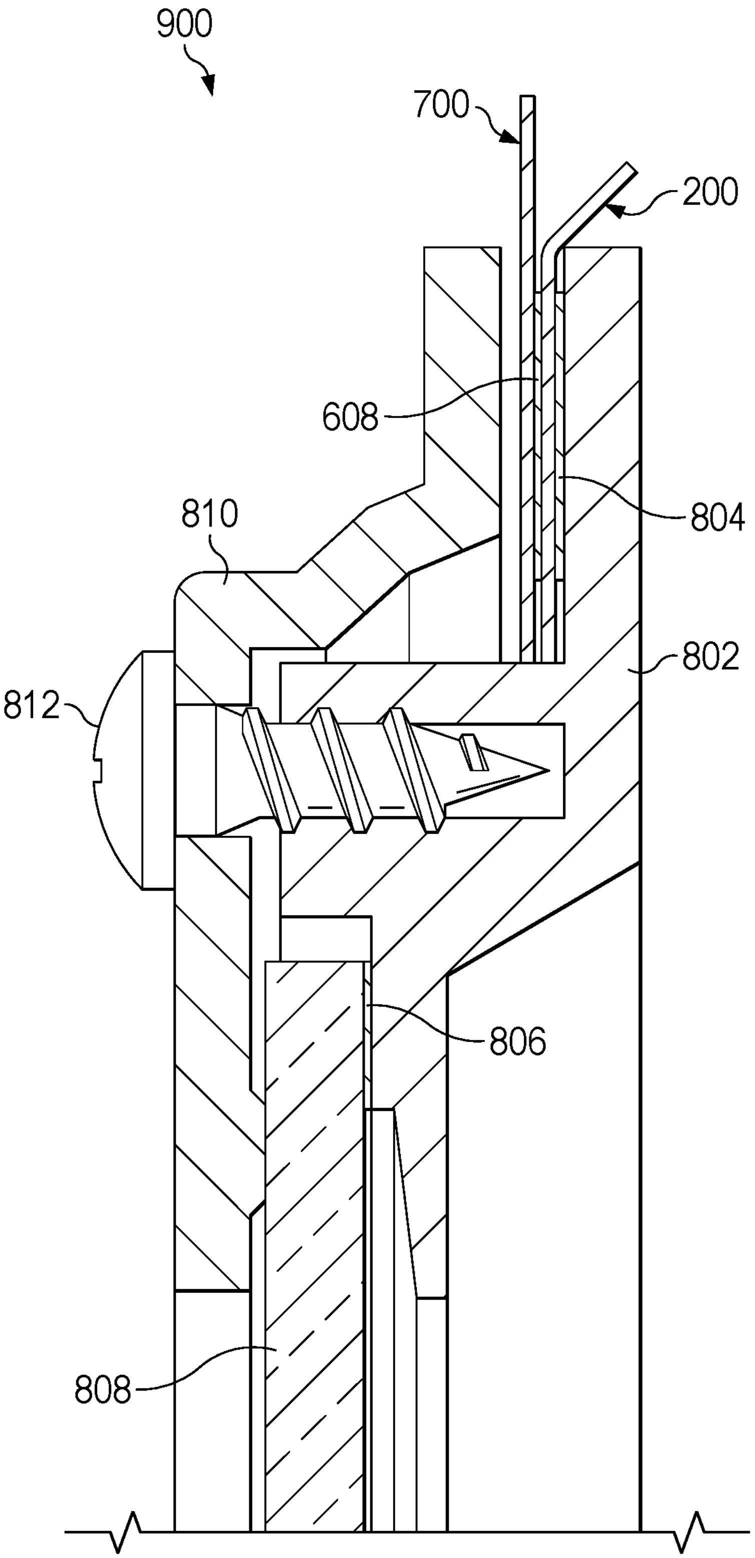
FIG. 9 is a sectional view of a panel and a lite frame assembly, according to some aspects of the present disclosure.

FIG. 9 is a sectional view 900 of a panel 106 and a lite frame assembly 800, according to some aspects of the present disclosure. In some embodiments, fasteners 812 may be used to couple the outer lite frame 802 to the inner lite frame 810. The frame-to-section seal 804 may couple the outer lite frame 802 to the ledge 208. It should be appreciated that the frame-to-section seal 804 may not be required in all embodiments to couple the outer lite frame to the ledge 208. The ledge adhesive 608 may couple the facer panel 200 to the backer panel 700. It should be appreciated that the ledge adhesive 608 may not be required in all embodiments to couple facer panel 200 to the backer panel 700. The glazing seal 806 may couple the translucent panel 808 and/or the inner lite frame 810 to the exterior surface 452. It should be appreciated that the glazing seal 806 may not be required in all embodiments to couple the translucent panel 808 and/or the inner lite frame 810 to the exterior surface 452. In some embodiments, the outer lite frame 802 may be coupled directly to the inner lite frame 810 instead of or in addition to being coupled to the ledge 208 and the exterior surface 452 respectively. In some embodiments, fasteners 812 may be used to couple the outer lite frame 802 to the inner lite frame 810.

Figure 10:
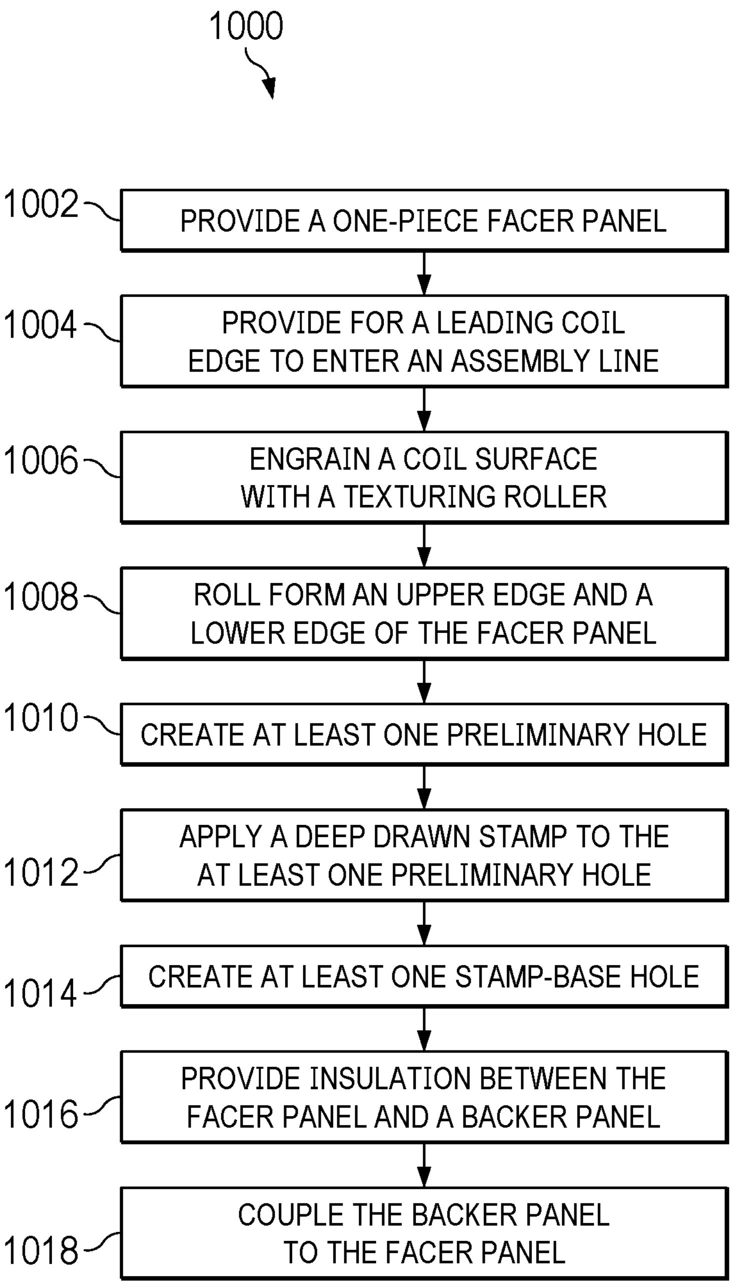
FIG. 10 is an illustrative method for increasing stamp-profile depth, according to some aspects of the present disclosure.

FIG. 10 is an illustrative method 1000 for increasing stamp-profile depth, according to some aspects of the present disclosure. At process 1002, at least one one-piece facer panel 200 may be provided. At optional process 1004, a leading coil edge may enter an assembly line. At optional process 1006, a coil surface may be engrained with a texturing roller.

At optional process 1008, the upper rail 218 and/or a lower rail 502 of the facer panel 200 may be roll formed to create a rail edge profile, which in some embodiments, may be referred to as a section edge profile and/or a joint profile. In some embodiments, the roll forming may involve multiple stages. In some embodiments, an initial low-angle roll forming (i.e., less than or equal to 45-degrees) may be performed on the sheet metal. In some embodiments, a 90-degree roll forming may be performed until the portion of the panel 106 has the desired shape. While 90 degrees is used in the example, other angles, larger and smaller are also contemplated. In some embodiments, some joint profiles may be complex curves and angles such as, for example, pinch-resistant joints. For example, in some embodiments, the upper rail 218 and/or upper lip 420 may be roll formed at 90 degrees such that the upper rail 218 and/or upper lip 420 may be perpendicular to adjacent surfaces. In some embodiments, a tongue 618 may be roll formed into a portion of the panel 106, such as the upper rail 218.

At process 1010, at least one preliminary hole may be created in the facer panel 200. The preliminary hole may be of any size and/or shape depending on the embodiment. At process 1012, a deep stamp profile may be applied to the at least one preliminary hole such that a deep drawn stamped region 204 forms. In some embodiments, a bezel 206 and/or a ledge 208 may form as a result of applying the deep stamp profile. The stamp may be larger than the cross-sectional area of the preliminary hole. In some embodiments, the deep stamp profile may be applied to the at least one preliminary hole in one or more stages. In some embodiments, the stamp profile may be ¾"-6" deep, and it should be understood that any other possible shape, size, and depth is contemplated. In some implementations, this manufacturing process may create stamp profiles at least as deep as the panel 106 is thick. It is worth noting that larger and smaller stamp-profile depths are contemplated. In some implementations, the backer panel 250 may be configured to allow an even deeper stamp profile. In some implementations, the size of the backer hole 702 may be increased to allow the stamp profile to extend through the backer panel 250. In some implementations, the backer panel 250 may include a recess to allow for the stamp profile to extend though the backer panel 250.

At optional process 1014, at least one stamp-base hole 304 is created. In some embodiments, the at least one preliminary hole will form a sufficient hole after the deep stamp profile is applied such that no additional cutting and/or punching is necessary to finish the stamp-base hole 304. In some embodiments, a finish punch and/or die cut may be applied to increase the size of the stamp-base hole 304 and/or to remove any sharp edges. As the cross-sectional area of the backer hole 702 increases, the size of the ledge 208 may decrease. In some embodiments, a backer hole 702 may be created in the backer panel 250 such that it aligns with the stamp-base hole 304.

At optional process 1016, insulation may be provided and/or placed between the facer panel 200 and the backer panel 250 in any way possible. For example, the volume between the facer panel 200 and the backer panel 250 (e.g., adjacent to the rails and stiles of the front surface 202) may be vacuum filled with insulation, such as insulation foam. For another example, beads, which expand into insulation, may be inserted into the volume between the facer panel 200 and the backer panel 250. For another example, an expanding foam may be inserted into the volume between the facer panel 200 and the backer panel 250, and the expanding foam may be allowed to expand such that it substantially fills the volume between the facer panel 200 and the backer panel 250. For another example, pre-cut insulation blocks, such as polystyrene blocks, may inserted in the volume between the facer panel 200 and the backer panel 250 before and/or after the facer panel 200 is coupled to the backer panel 250. In some embodiments, the insulation may be any material commonly used for insulation such as fiberglass, cellulose, foam, mineral wood, natural fibers, and/or denim. In some embodiments, the insulation may be a foam. In some embodiments, the insulation foam may be polyurethane (PU), expanded polystyrene (EPS), polyisocyanurate, cementitious foam, and/or any other type of foam. Depending on the embodiment, adhering the facer panel 200 to the backer panel 250 may use adhesive, PU from the foaming process, or some other attachment method. In some embodiments, the insulation may be inserted inside and/or adjacent to the space between the facer panel 200 and the backer panel 250. In some embodiments, the insulation may be placed inside and/or adjacent to the space between the facer panel 200 and the backer panel 250. In some embodiments, the insulation may be used at least partially to insulate the panel. In some embodiments, the insulation may be used at least partially to structurally support the panel. In some embodiments, the insulation may be used as an adhesive. In some embodiments, the insulation may be used to adhere the backer panel 250 to the facer panel 200. In some embodiments, the insulation comprising a foam may increase the adhesive strength of the insulation. In some embodiments, there may be no insulation in the volume between the facer panel 200 and the backer panel 250. In some embodiments, the insulation may be used to increase the adhesion of another adhesive, such as the ledge adhesive 608, the lip adhesive, the frame-to-section seal 804, and/or the glazing seal 806. Additional insulation panels may be attached to the exterior surface 452 of the backer panel 250 to provide additional insulating properties for the door behind the stamped positions.

At optional process 1018, the backer panel 250 may be coupled to the facer panel 200. Depending on the embodiment, the coupling of the backer panel 250 to the facer panel may be accomplished by any way possible. In some embodiments, the coupling may be accomplished by placing the backer panel adjacent to the facer panel. In some embodiments, the coupling may be accomplished by any kind of mechanical coupling, such as fasteners. In some embodiments, the coupling may be accomplished by an adhesive, such as a structural acrylic adhesive, epoxy, polyurethane, and/or cyanoacrylate. In some embodiments, the coupling may be accomplished by an adhesive foam, such as PU, EPS, polyisocyanurate, cementitious foam, and/or any other type of foam.

In some embodiments, any edge(s) of the sheet metal may be hemmed, soldered, brazed, and/or welded to avoid sharp edges.

It should be appreciated that any of the steps of method 1000 may be completed in any order. It should also be appreciated that some or all optional steps may be completed depending on the embodiment. The order of the steps in method 1000 may be changed indiscriminately as manufacturing creates a panel and/or door system.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A panel for a sectional door, the panel comprising:

a one-piece, sheet-metal facer panel comprising a front surface, a back surface, and a drawn ledge, the drawn ledge disposed at a position spaced a distance apart from both the front surface and the back surface, the drawn ledge defining a hole through the one-piece, sheet-metal facer panel, the one-piece, sheet-metal facer panel comprising an upper lip and a lower lip, the upper lip and the lower lip each being spaced a first distance from the back surface, the drawn ledge being spaced the first distance from the back surface; and a backer panel comprising an interior surface configured to at least partially cover the hole in the one-piece, sheet-metal facer panel, the interior surface being positioned to support the drawn ledge.

2. The panel of claim 1, wherein the one-piece, sheet-metal facer panel further comprises a bezel extending between the front surface and the drawn ledge.

3. The panel of claim 2, wherein the bezel is inclined.

4. The panel of claim 1, further comprising insulation disposed between the one-piece, sheet-metal facer panel and the backer panel.

5. The panel of claim 1, wherein the backer panel comprises a backer hole, the backer hole being at least partially aligned with the hole of the one-piece, sheet-metal facer panel.

6. The panel of claim 5, further comprising an outer lite frame, an inner lite frame, and a translucent panel, the outer lite frame being positioned to support the drawn ledge and the inner lite frame being positioned to support an exterior surface.

7. A panel for a sectional door, the panel comprising:

a one-piece, sheet-metal facer panel comprising a front surface, a back surface, and a drawn ledge, the drawn ledge disposed at a position spaced a distance apart from both the front surface and the back surface, the drawn ledge defining a hole through the one-piece, sheet-metal facer panel, wherein the one-piece, sheet-metal facer panel comprises an upper lip and a lower lip, the upper lip and the lower lip being coplanar with the drawn ledge; and a backer panel comprising an interior surface configured to cover the hole in the one-piece, sheet-metal facer panel, the interior surface being positioned to support the drawn ledge.

8. A panel for a sectional door, the panel comprising:

a one-piece, sheet-metal facer panel comprising a front surface, a back surface, and a drawn ledge, a deep drawn stamped region extending from the front surface, through the back surface, and to the drawn ledge, the drawn ledge disposed at a position spaced a distance apart from both the front surface and the back surface, the drawn ledge defining a hole through the one-piece, sheet-metal facer panel, the one-piece, sheet-metal facer panel comprising two lips, each of the two lips being spaced a first distance from the back surface, the drawn ledge being spaced the first distance from the back surface; and a backer panel comprising an interior surface configured to at least partially cover the hole in the one-piece, sheet-metal facer panel, the interior surface being positioned to support the drawn ledge.

9. The panel of claim 8, wherein the deep drawn stamped region further comprises a bezel extending between the front surface and the drawn ledge.

10. The panel of claim 9, wherein the bezel is inclined.

11. The panel of claim 8, further comprising insulation disposed between the one-piece, sheet-metal facer panel and the backer panel.

12. The panel of claim 8, wherein the backer panel comprises a backer hole, the backer hole being at least partially aligned with the hole of the one-piece, sheet-metal facer panel.

13. The panel of claim 12, further comprising an outer lite frame, an inner lite frame, and a translucent panel, the outer lite frame being positioned to support the drawn ledge and the inner lite frame being positioned to support an exterior surface.

14. A panel for a sectional door, the panel comprising:

a one-piece, sheet-metal facer panel comprising a front surface, a back surface, and a drawn ledge, a deep drawn stamped region extending from the front surface, through the back surface, and to the drawn ledge, the drawn ledge disposed at a position spaced a distance apart from both the front surface and the back surface, the drawn ledge defining a hole through the one-piece, sheet-metal facer panel, wherein the one-piece, sheet-metal facer panel further comprises an upper lip and a lower lip, the upper lip and the lower lip being coplanar with the drawn ledge; and a backer panel comprising an interior surface configured to cover the hole in the one-piece, sheet-metal facer panel, the interior surface being positioned to support the drawn ledge.

15. A method of manufacturing a panel for a sectional door, the method comprising:

providing a one-piece, sheet-metal facer panel comprising a front surface, a back surface, and a lip, the lip being spaced a first distance from the back surface;

creating a hole through the one-piece, sheet-metal facer panel extending from the front surface to the back surface, the hole comprising a cross-sectional area parallel to the front surface and the back surface;

stamping an area on the front surface larger than the cross-sectional area of the hole such that a drawn ledge forms, the drawn ledge disposed at a position offset from the front surface and the back surface, the drawn ledge being spaced the first distance from the back surface; and positioning an interior surface of a backer panel to support the drawn ledge.

16. The method of claim 15, wherein the method further comprises increasing the cross-sectional area of the hole by decreasing the area of the drawn ledge.

17. The method of claim 15, wherein the method further comprises providing an upper lip and a lower lip, the upper lip and the lower lip being coplanar with the drawn ledge.

18. The method of claim 15, wherein the method further comprises providing insulation disposed between the one-piece, sheet-metal facer panel and the backer panel.

19. The method of claim 15, wherein the method further comprises providing a backer hole in the backer panel aligned with an inner perimeter of the drawn ledge.

20. The method of claim 15, wherein the stamping the area on the front surface larger than the cross-sectional area of the hole such that the drawn ledge forms further comprises forming a bezel extending between the front surface and the drawn ledge.

* * * * *